United States Patent Office 2,915,364
Patented Dec. 1, 1959

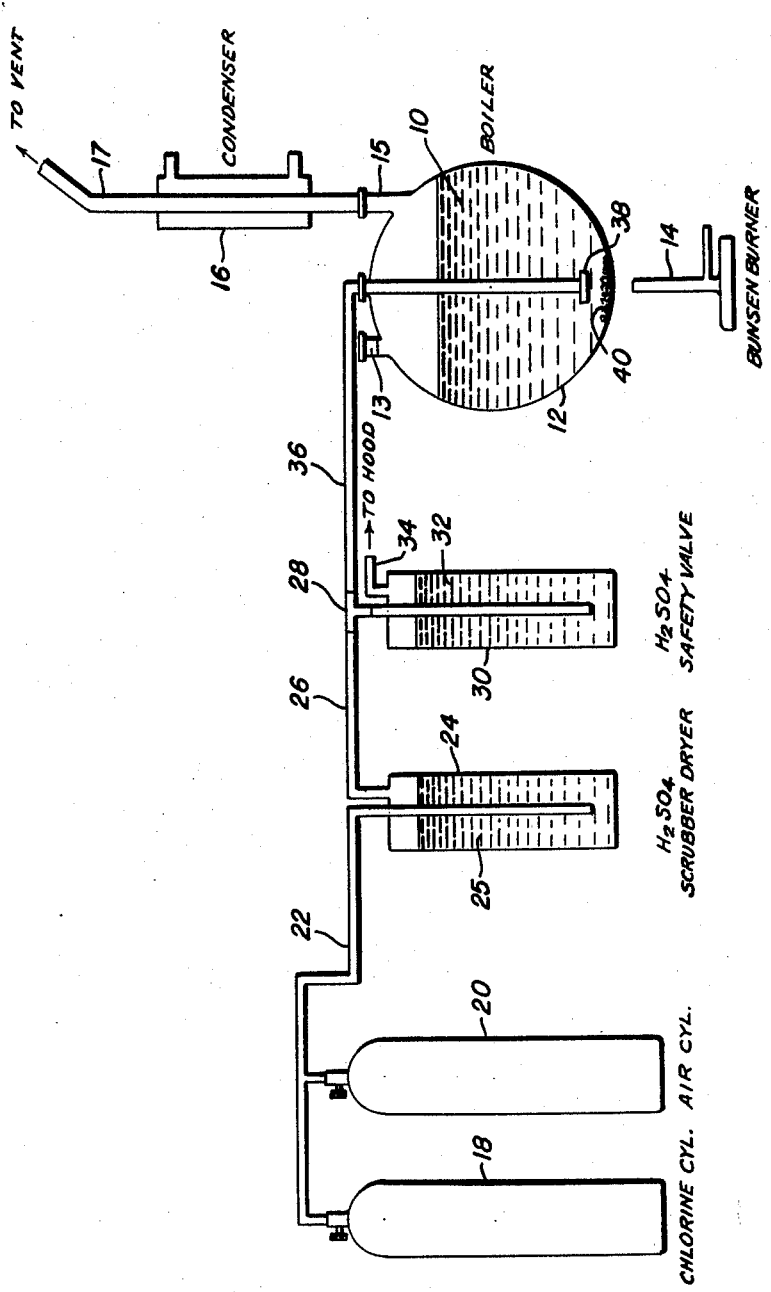

---

2,915,364

PREPARATION OF PURE TITANIUM TETRACHLORIDE

Wilbur Stanley Clabaugh, Bethesda, Md., and Raleigh Gilchrist, Washington, D.C., assignors to the United States of America as represented by the Secretary of the Navy Application May 25, 1956, Serial No. 587,442

10 Claims. (Cl. 23—87)

(Granted under Title 35, U.S. Code (1952), sec. 266)

The invention described herein may be manufactured and used by or for the Government of the United States for governmental purposes without the payment of any royalties thereon or therefor.

This invention relates to a process of purification of a chemical compound, in particular titanium tetrachloride ($TiCl_4$) and has for its general object the preparation of this compound in state of high chemical purity.

It is also an object of this invention to purify titanium tetrachloride to such an extent that the physical properties thereof may be accurately determined.

It is a further object of this invention to purify titanium tetrachloride to such an extent that metallic titanium may be obtained therefrom free from all impurities.

Other objectives such as relative low cost of operation will be apparent from the following description and drawings in which the figure is a flow chart showing generally the apparatus for, and method of carrying out the process.

Titanium tetrachloride is generally produced by the reaction of chlorine with an intimate mixture of a titanium bearing ore (or titanium compounds) and a carbonaceous material. The titanium tetrachloride so produced will consequently contain as impurities volatile chlorides formed from substances occurring in both the titaniferous and carbonaceous materials. Among the possible impurities will be chlorides and oxychlorides of iron, vanadium, silicon, tin and carbon, especially carbonyl chloride and other chlorinated organic compounds.

The conventional methods for refining the crude tetrachloride consist of a preliminary treatment of the liquid and a subsequent distillation. Among the substances used for preliminary treatment are sulfur, hydrogen sulfide, sulfuric acid, water, oleic and stearic acids, metallic soaps and a number of metals including copper. The particular functions of most of these substances have not been made clear. Copper, however, appears to be very suitable for removing vanadium.

Experience with these methods, as well as with variations thereof, showed that none of them consistently yielded high purity titanium tetrachloride. Much depends on the previous history of the so-called crude material. In attempting to prepare titanium tetrachloride in as high a state of purity as possible, for use in determining its fundamental properties, it was found by means of infrared spectroscopy that organic material was the most persistent impurity. Emission spectroscopy showed that all metallic impurities except vanadium and tin were eliminated by a simple distillation of the tetrachloride. Vanadium was removed by a special treatment of the tetrachloride described below. Tin was removed by means of a highly efficient still.

The destruction and elimination of organic compounds in the tetrachloride was therefor seen to be the major problem in the preparation of titanium tetrachloride in pure form.

These inventors have found that organic matter may be removed from the titanium tetrachloride by addition of chlorine to the refluxing tetrachloride; and that the destruction of organic matter may be accomplished more rapidly if aluminum chloride hexahydrate and water are added as catalysts. It is convenient and preferable to add the said aluminum salt as a slurry with an equal amount of water. The total quantity of aluminum chloride hexahydrate and water added is about 2 percent of the mass of the titanium tetrachloride. A period of 2 to 6 hours refluxing under these conditions is sufficient to complete the elimination of organic impurities. Subsequent removal of the chlorine is accomplished by passing a stream of clean, dry air through the boiling tetrachloride. The tetrachloride is then distilled. If the distilled product contains vanadium it is colored yellow. By redistillation of this yellow colored liquid in the presence of greaseless, copper turnings, as indicated by reference number 40 the vanadium is eliminated and the color of the liquid becomes water clear.

Specifically, the process of purification of the titanium tetrachloride will now be described reference being had to the drawing, in which a flow diagram is illustrated showing the conventional chemical apparatus arranged in line of flow. As shown therein the titanium tetrachloride 10 containing impurities is introduced into a three necked flask 12 through neck 13. This chloride is liquid at ordinary temperatures. It has a freezing point of about $-24°$ C. The liquid being halogenated in this flask is substantially non-aqueous. At this point the catalyst (aluminum chloride hexahydrate plus an equal amount of water) is introduced through neck 13 in an amount equal to about 2% of the weight of the tetrachloride.

The chloride in flask 12 is brought to boiling temperatures by the application of heat from a source such as Bunsen burner 14. The vaporous tetrachloride rises through neck 15, passes into condenser 16 and drains back or refluxes into flask 12. Any excess chlorine and the more volatile chlorides pass on out through vent 17. After the tetrachloride reaches the boiling temperature chlorine from cylinder 18 is bubbled through strong sulfuric acid 25 in flask 24 through T-tube 28, tube 36 and fritted or porous disc 38 whereby it is disseminated throughout the liquid tetrachloride. As above indicated the chlorine is introduced into the tetrachloride for a period of from 2 to 6 hours. At the end of this reflux period all of the organic material will have been eliminated.

A safety valve in the line of flow is provided comprising flask 30, containing strong sulfuric acid 32, entrant tube which is the stem of T-tube 28 and vent tube 34. This safety valve functions to prevent any excessive build up in pressure in the system when there is any stoppage in the gas flow in the line beyond this valve.

If the tetrachloride is colored slightly yellow at this point in the process, it is due to the presence of vanadium. The color of the tetrachloride is now made clear by the introduction of clean, greaseless copper turnings into flask 12 through neck 13. This copper evidently has a strong affinity for vanadium. The turnings become black and the supernatant tetrachloride becomes water clear.

These inventors have also found that organic matter can be eliminated from the tetrachloride by the addition of liquid bromine in an amount equal to about one percent of the weight of the tetrachloride. The bromine is introduced into flask 12 through neck 13 and the solution is then gently refluxed for several hours. The advantage of the elimination of the carbonaceous impurities by the addition of liquid bromine to the tetrachloride is that no catalyst is required to promote the rate of the reaction.

Whether the carbonaceous matter is eliminated by either the addition of chlorine or bromine to the tetrachloride, the excess of these two components is removed by the passage of clean, dry air through the tetrachloride. The tetrachloride is then distilled. By a simple distillation of the tetrachloride a purity of 99.99 percent of TiCl₄ may be attained. If a greater degree of purity is required distillation of the tetrachloride in a Podbielniak stil is made. Careful distillation in this type of still resulted in a purity of 99.999 percent $TiCl_4$.

Three independent physical methods were used to establish the purity of the titanium tetrachloride prepared by the foregoing methods of refining.

These three methods were:
(1) The cryoscopic measurement of purity.
(2) The spectrochemical measurement of impurities.
(3) Test by infrared radiation.

To determine the degree of purity of the tetrachloride under (1) above, 50 ml. of the purified compound was transferred to a specially constructed iridioplatinum calorimeter in a high vacuum. The material in the calorimeter was then frozen and gradually melted under equilibrium conditions. In this method it is possible to determine only those impurities that are insoluble in the crystalline phase but soluble in the liquid phase. The triple-point, i.e., the lowest temperature at which the three phases, solid, liquid and gas may co-exist, was determined in this process and was found to be 249.045±0.010° K.

TABLE 1.—RESULTS OBTAINED FOR THE PURITY OF $TiCl_4$

| 1./F [1]: | Observed T [2] ° K. |
|---|---|
| 15.53 | 249.0369 |
| 6.32 | 249.0418 |
| 3.53 | 249.0429 |
| 2.45 | 249.0437 |
| 1.73 | 249.0444 |
| 1.14 | 249.0444 |
| 1 | [3] 249.0445 |
| 0 | [3] 249.0450 |

The triple-point temperature, 249.045±0.010° K.
[1] F is the fraction melted.
[2] The last two digits are significant only in the determination of small temperature differences.
[3] Extrapolated.

The plot of the observed results yielded a slope of 0.00052, using 0.018 as the cryoscopic constant $$(\Delta H_m/RT^2)$$

calculated from the handbook value of the heat of fusion ($\Delta H_m = 12.5$ cal./g.), the mole fraction of impurity becomes 0.000009. The mole percent purity was calculated to be 99.9990. The uncertainty of this figure is estimated to be ±0.0002.

The purity of the product obtained by simple chemical refining, without subsequent resort to the Podbielniak still, was calculated to be 99.999±0.002 mole percent.

To determine impurities in the titanium tetrachlorides by 2, above, experiments were made to ascertain the feasibility of diluting the tetrachloride with water so that known quantities of certain elements could be added for control purposes. It was found that the tetrachloride could be slowly diluted with water at the temperature of melting ice without hydrolytic precipitation of titanium.

For preparation of such an aqueous solution equal volumes of ice-cold tetrachloride and ice-cold water were taken. Either component may be added to the other two drops at a time allowing the mixture to stand between additions in an ice bath until fumes that form dissolve in the mixture. The one-to-one mixture is a thick sirupy yellow mass, which gradually becomes a yellow transparent solution. On further dilution with water, the solution may become slightly cloudy, but this cloudiness disappears on standing. It should be emphasized that the whole foregoing operation must be conducted slowly.

Concentrations of 4, 8 and 12 g. of elemental titanium in 100-ml. volumes were successfully prepared. These diluted solutions were remarkably stable. Such a solution, containing 8 g. of titanium in a volume of 100 ml., remained clear for more than four months at room temperature.

Measured amounts of the titanium solutions were placed on graphite electrodes and the electrodes dried at 105° C. The electrodes were then used as anodes in a 15-ampere direct current arc. To determine the limit of detection of various foreign elements, known quantities of the elements in the form of their salts were added to the solutions of the titanium tetrachloride. The limits of detection of impurities in parts per million of titanium tetrachloride are given in Table 2.

TABLE 2.—LIMITS OF DETECTION OF IMPURITIES IN TITANIUM TETRACHLORIDE BY SPECTROCHEMICAL MEANS

| Element | Limit of Detection, p.p.m. | Element | Limit of Detection, p.p.m. |
|---|---|---|---|
| Silver | 0.2 | Magnesium | 0.05 |
| Aluminum | 1 | Manganese | 0.1 |
| Gold | 1 | Molybdenum | 10 |
| Boron | 0.1 | Nickel | 1 |
| Beryllium | 0.02 | Lead | 0.5 |
| Calcium | 0.05 | Antimony | 2 |
| Columbium (Niobium) | 40 | Silicon | 0.5 |
| Cobalt | 10 | Tin | 0.2 |
| Chromium | 1 | Tantalum | 15 |
| Copper | <0.1 | Vanadium | 2 |
| Iron | 0.1 | Tungsten | 15 |
| Gallium | 0.5 | Zirconium | 15 |
| Hafnium | 50 | | |

The limits of detection of elements not listed in the table have not been established.

The values given are expressed in parts of the metallic impurity in one million parts of titanium tetrachloride.

TABLE 3.—RESULTS OF THE SPECTROCHEMICAL EXAMINATION OF REFINED TITANIUM TETRACHLORIDE

| Element | Material No. 1, p.p.m. | Material No. 2, p.p.m. | Material No. 3, p.p.m. |
|---|---|---|---|
| Silver | <0.5 | 0.2 | 0.2 |
| Aluminum | —? | — | — |
| Gold | — | — | — |
| Boron | 0.2 | 0.2 | 0.2 |
| Beryllium | — | — | — |
| Calcium | 0.2 | 0.1 | 0.2 |
| Columbium (Niobium) | — | — | — |
| Cobalt | — | — | — |
| Chromium | — | — | — |
| Copper | 0.2 | 0.2 | 0.2 |
| Iron | <0.5 | 2 | 1 |
| Gallium | — | — | — |
| Hafnium | — | — | — |
| Magnesium | <0.1 | <0.1 | <0.1 |
| Manganese | — | — | — |
| Molybdenum | — | — | — |
| Nickel | — | — | — |
| Lead | — | — | — |
| Antimony | — | — | — |
| Silicon | 0.5 | 0.5 | 1 |
| Tin | — | 5 | 5 |
| Tantalum | — | — | — |
| Vanadium | — | — | — |
| Tungsten | — | — | — |
| Zirconium | — | — | — |

NOTE.—< means less than; — means not detected; —? means detection doubtful.

The results given in Table 3 were obtained on the spectrochemical examination of (1) the tetrachloride of 99.9990 percent purity; (2) the tetrachloride of 99.992 percent purity; (3) a tetrachloride that was chemically refined from starting material intentionally contaminated with silicon, iron, lead, mercury, vanadium, copper, aluminum, sulfur, and various organic substances such as carbonyl chloride, ether, acetic acid and chloroacetyl chlorides. The refining method used on material No. 3 was the same as that used on material No. 2 except that the final product was not vacuum-distilled.

Infrared spectroscopy proved to be a valuable aid in detecting and determining those impurities in titanium tetrachloride not readily or easily determined by other means. Some of the substances determinable by infrared absorption spectroscopy are listed in Table 4.

TABLE 4.—CHARACTERISTIC INFRARED ABSORPTION PEAKS AND LIMITS OF DETECTION OF COMMON IMPURITIES IN TITANIUM TETRACHLORIDE

| Impurity | Wavelength of Peak, $\mu$ | Limit of Detection, p.p.m. |
|---|---|---|
| Hydrogen chloride, $HCl$ | 3.53 | 2 |
| Carbon dioxide, $CO_2$ | 4.30 | ? |
| Vanadium oxytrichloride, $VOCl_3$ | 4.84 | 40 |
| Carbonyl chloride, $COCl_2$ | 5.51 | ca. 2 |
| Chloroacetyl chloride, $ClCH_2COCl$ | 5.55 | 0.5 |
| Dichloroacetyl chloride, $Cl_2CHCOCl$ | 5.55 | 1 |
| Trichloroacetyl chloride, $Cl_3CCOCl$ | 5.55 | 0.5 |
| Silicon tetrachloride, $SiCl_4$ | 8.14 | 200 |
| Hydrolysis product | 8.45 | ? |

No effort was made to ascertain the limits of detection for carbon dioxide or hydrolysis product, because both of these substances can be eliminated by a single careful distillation in an inert atmosphere or in a high vacuum. Whereas the sensitivity as shown by the above table is not good for either vanadium oxytrichloride or silicon tetrachloride, vanadium and silicon can be determined by other methods. Vanadium oxytrichloride produces a visible yellow color in low concentrations, and 1 part per million can be detected spectrophotometrically at 390 millimicrons if a 10-mm. cell is used. As shown in Table 2 silicon can be detected by spectrochemical means in a concentration as low as 0.5 part in one million.

Infrared examination revealed that material No. 1 contained about 1 part of trichloracetyl chloride in one million parts of titanium tetrachloride; material No. 2, 8 parts; and material No. 3, between 2 and 3 parts.

Although this invention has been described and illustrated with reference to specific details of carrying out the process on a small scale in a laboratory, it is not intended that the invention should be limited to the particular apparatus shown as obviously commercial scale operation would involve the use of greater masses of materials and apparatus of greater volume. The apparatus used in commercial scale operation would necessarily be the mechanical equivalent of that shown and illustrated herein.

We claim:

1. The process of eliminating organic impurities present in titanium tetrachloride comprising the steps of adding a halogen selected from the group consisting of chlorine and bromine to a quantity of liquid titanium tetrachloride containing organic impurities, placing the titanium tetrachloride in a container provided with a refluxing condenser, refluxing the titanium tetrachloride in the presence of the added halogen for a period of several hours until the organic impurities have been eliminated.

2. The process of eliminating organic and vanadium impurities present in titanium tetrachloride comprising the steps of placing a quantity of liquid titanium tetrachloride containing organic and vanadium impurities in a container provided with a refluxing condenser, refluxing the titanium tetrachloride in the presence of an added halogen selected from the group consisting of chlorine and bromine for a period of several hours until the organic impurities are eliminated, passing clean dry air through the refluxed mixture to remove any halogen and halogenated salts remaining in said mixture, and adding metallic copper to the refluxed mixture to remove vanadium therefrom.

3. The combination of claim 1 further defined in that the halogen added is liquid bromine.

4. The combination as defined in claim 1 further defined in that the halogen therein added is liquid bromine in the amount of about 1% of the weight of the tetrachloride.

5. The process of eliminating organic and vanadium impurities present in titanium tetrachloride comprising the steps of placing a quantity of liquid titanium tetrachloride containing organic impurities in a container provided with a refluxing condenser, refluxing the titanium tetrachloride for a period of time in the presence of an added halogen selected from the group consisting of chlorine and bromine until the organic impurities are eliminated, passing clean dry air through the refluxed mixture to remove any halogen and halogenated salts therefrom, adding copper particles to the refluxed mixture to remove vanadium, and distilling said refluxed mixture to remove any metallic salts remaining in said mixture.

6. The process as defined in claim 5 wherein the halogen added is liquid bromine in the amount of about 1% of the weight of the tetrachloride.

7. The process of eliminating organic impurities present in titanium tetrachloride comprising the steps of placing titanium tetrachloride containing organic impurities in a container provided with refluxing condenser, adding chlorine and a catalyst comprising a slurry of aluminum chlorine hexahydrate and water in substantially equal parts, refluxing the titanium tetrachloride in the container while bubbling chlorine through the titanium tetrachloride until the organic impurities are eliminated.

8. The process of eliminating organic impurities present in titanium tetrachloride comprising the steps of placing titanium tetrachloride containing organic impurities in a container provided with a refluxing condenser, adding chlorine and a catalyst comprising aluminum chloride hexahydrate and water, refluxing the titanium tetrachloride in the container while bubbling chlorine through the tetrachloride until the organic impurities are eliminated.

9. The process of eliminating organic and vanadium impurities present in titanium tetrachloride comprising the steps of placing titanium tetrachloride containing organic and vanadium impurities in a container provided with a refluxing condenser, adding chlorine and a catalyst comprising aluminum chloride hexahydrate and water, refluxing the titanium tetrachloride in the container while bubbling chlorine through the titanium tetrachloride until the organic impurities are eliminated, passing clean dry air through the refluxing mixture to remove any chlorine and chlorinated salts therefrom, adding copper particles to the refluxing mixture to remove vanadium and distilling said refluxing mixture to remove any metallic salt remaining in said mixture.

10. The combination of claim 9 further defined in that the catalyst is added in the amount of about 2% of the weight of the tetrachloride.

References Cited in the file of this patent

UNITED STATES PATENTS

| | | |
|---|---|---|
| 2,178,685 | Gage et al. | Nov. 7, 1939 |
| 2,289,328 | Pechukas | July 7, 1942 |
| 2,598,898 | Espenschied | June 3, 1952 |
| 2,608,881 | Kay et al. | June 17, 1952 |
| 2,758,009 | Guthrie | Aug. 7, 1956 |

OTHER REFERENCES

Abstract of application, S.N. 653,699, filed Mar. 11, 1946, published in Official Gazette, May 30, 1950, vol. 634, pp. 1637.

Mellor: "Comprehensive Treatise on Inorganic and Theoretical Chemistry," vol. 2, page 66, published by Longmans, Green and Co., N.Y., 1922.